D. Russell.

Straw Cutter.

N° 12,696.  Patented Apr. 10, 1855.

UNITED STATES PATENT OFFICE.

DAVID RUSSELL, OF DREWERSBURG, INDIANA.

STRAW-CUTTER.

Specification of Letters Patent No. 12,696, dated April 10, 1855.

*To all whom it may concern:*

Be it known that I, DAVID RUSSELL, of Drewersburg, in the county of Franklin, in the State of Indiana, have invented a new and useful Improvement in Straw-Cutters; and I do hereby declare that the following is a full and exact description of the same, reference being had to the accompanying drawings and to the letters of reference marked thereon, like letters referring to like parts of the machine.

Figure 1:
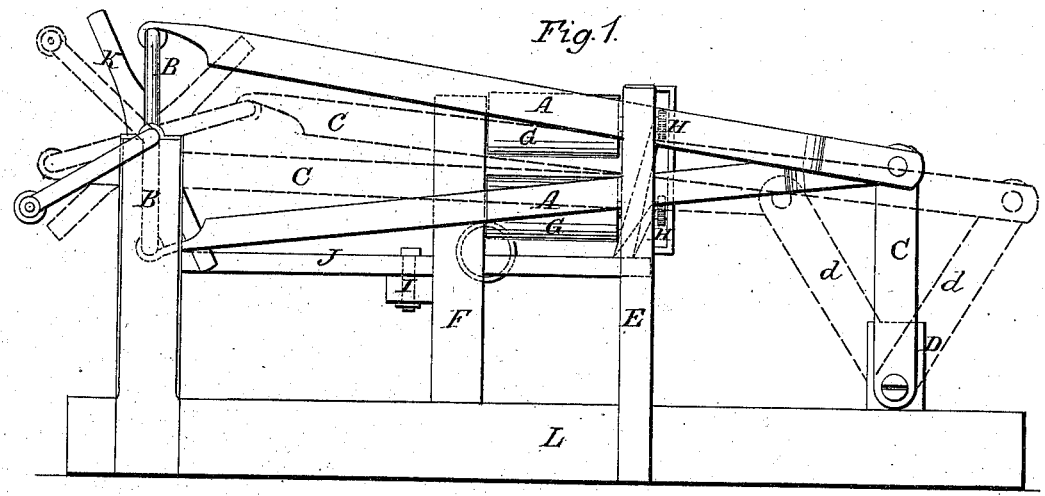
Figure 2:
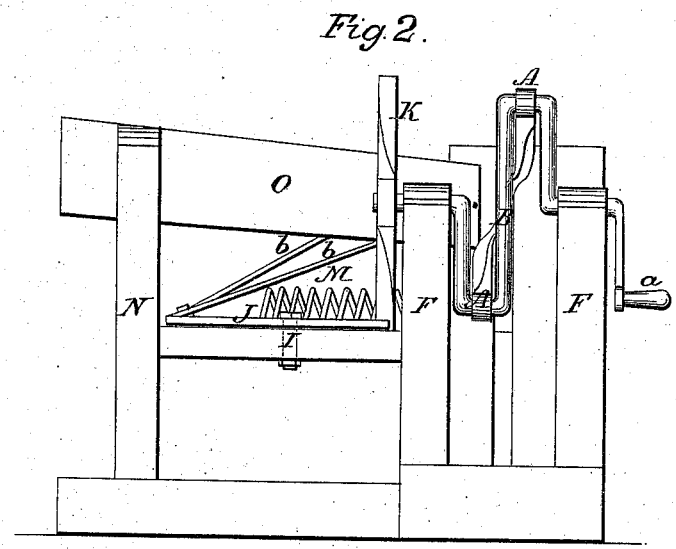

Figure 1 is a face elevation. Fig. 2 is a side elevation.

To enable others skilled in the art to make, and use my invention I will proceed to describe its construction and operation.

Fig. 1, letters A, A, are the knives; B, the double crank; C, the upright levers to which the knives are fastened, and act as hinges; D, the upright to which the levers C are attached; E, the uprights for steadying the knives and for keeping them together; F, the front side of the frame, in which the crank B, is placed and between which it revolves; G, G, the feed rollers; H, a ratchet in which a pawl b works; I, brace running lengthwise of the box; J, lever resting on brace I, having its fulcrum on the same, and fastened to pawls, b, b; K, a cam lever for operating the feed motion; L, base of the frame.

Fig. 2 is a side elevation. A, A, the ends of the knives where they are attached to the crank; B, double crank; a, the handle; F, F, the posts for the double crank to revolve in; I, brace; J, lever resting on brace I; b, pawls for feeding; K, cam lever; L, L, base of the frame; M, spiral spring; N, the back uprights; O, the box.

In operating my machine by revolving the crank B, the knives are made to oscillate or vibrate in a vertical direction as shown in the red lines c, c, and the reciprocating motion is given them behind, where they are fastened at C and operate in the arc of a circle as shown in the red lines d, d, giving to the knives each time they vibrate a shear cut thereby making two shear cuts in each revolution of crank B, which is the best device for cutting straw, or other articles of food. And as the crank revolves, the cam lever K operates on the lever J, which moves the pawls b, b, which turn the ratchet H, and rollers G, G, thereby feeding the material between the knives at the proper time for them to cut it at each shear stroke given to the knives as crank B revolves.

Having described the construction and operation of my machine, what I claim as new and desire to secure by Letters Patent, is:

1. Knives A, A, in combination with the double crank B, and lever C, thereby giving to the knives an oscillatory reciprocating motion, by which means I obtain two shear cuts of the knives at each revolution of the double crank B, as herein described, and claimed.

2. I claim the cam lever K and crank B, in combination with lever J, and pawls b, b, ratchet H, and feed rollers G, G, for the purpose of feeding the straw, or other material to the knives as set forth.

DAVID RUSSELL.

Attest:
T. G. CLAYTON,
O. C. WILLSON.